May 7, 1940.        J. A. COURVILLE        2,199,659
POWER TAKE-OFF FOR AUTOMOBILES
Filed July 20, 1939        2 Sheets-Sheet 2
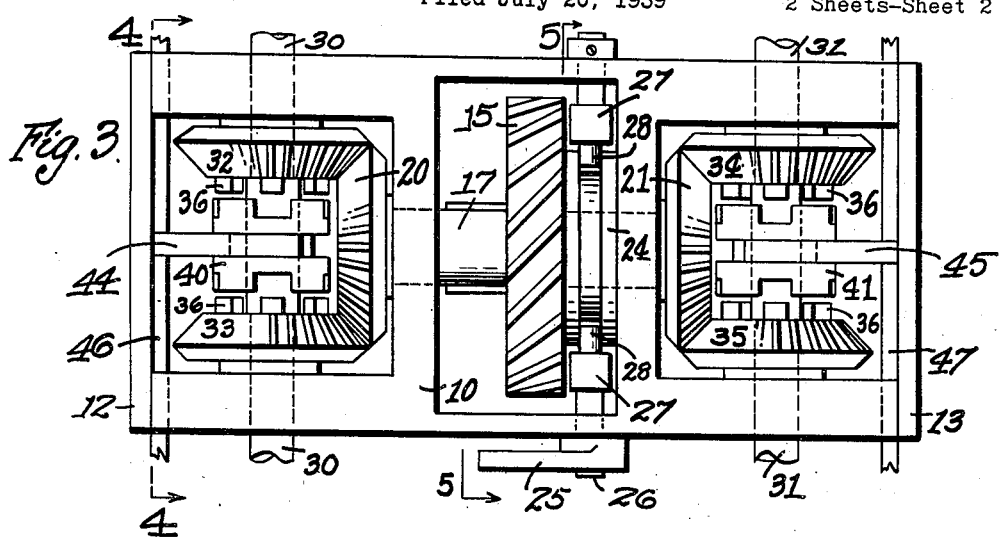
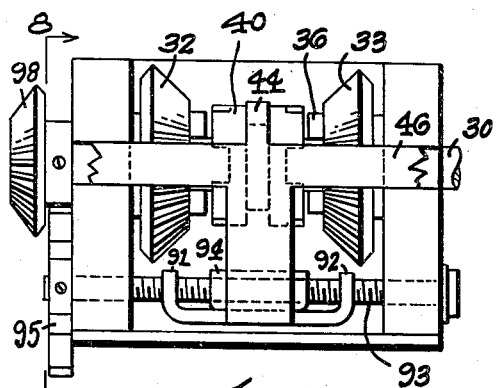
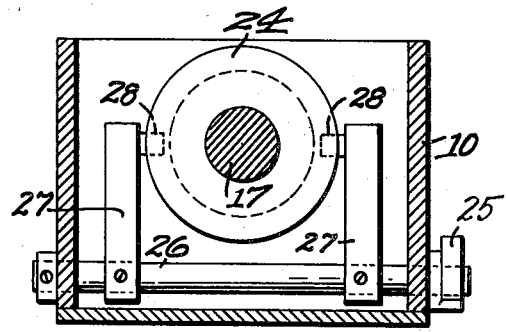
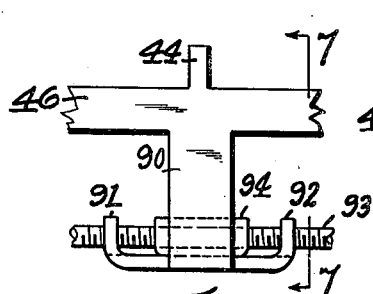
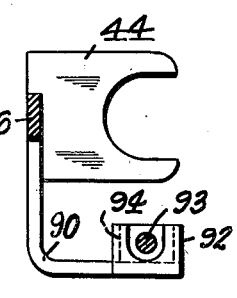
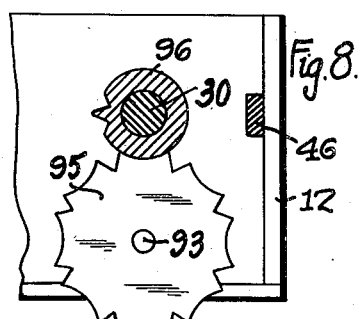
Inventor
Joseph A. Courville Patented May 7, 1940

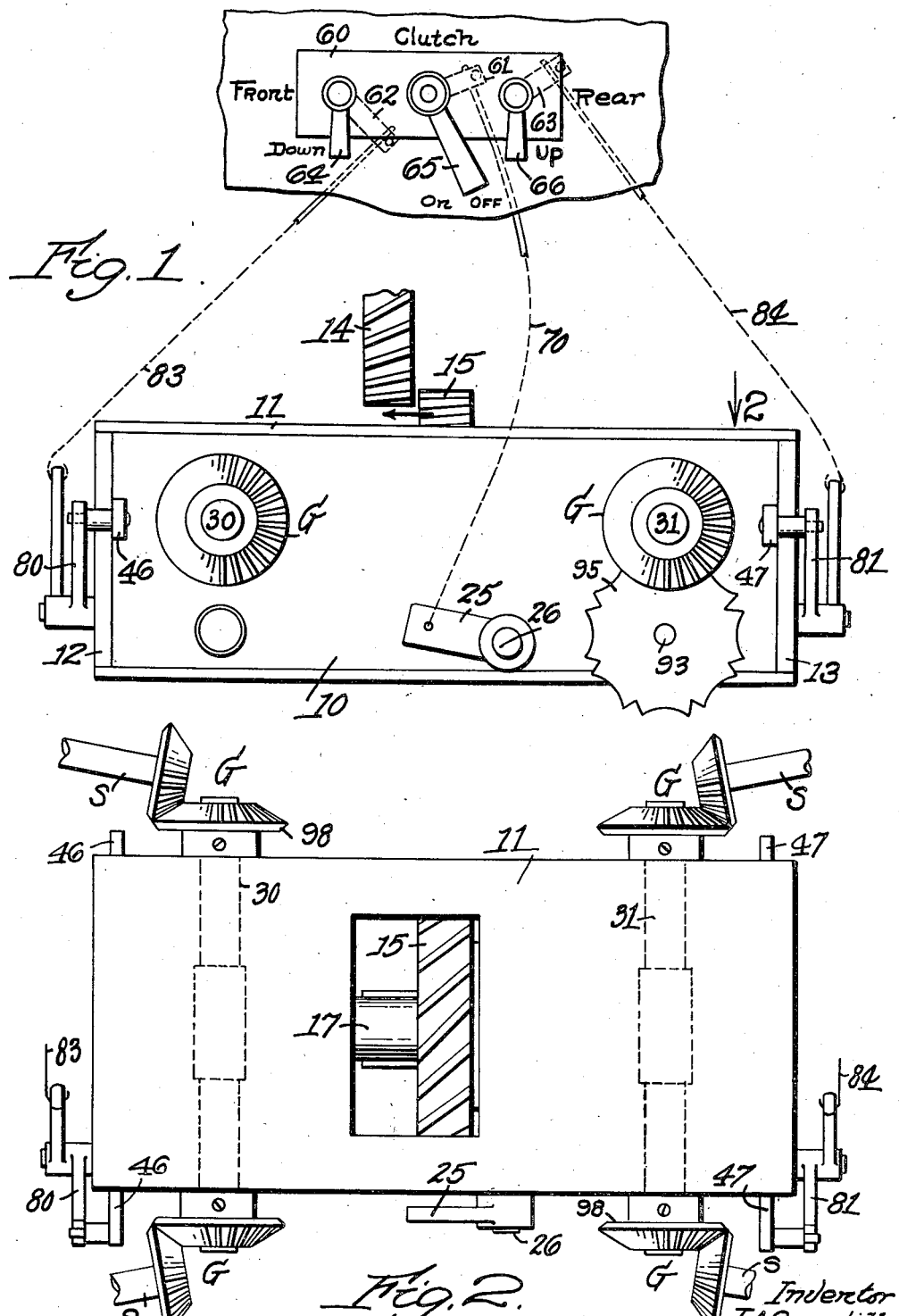

2,199,659

UNITED STATES PATENT OFFICE 2,199,659

POWER TAKE-OFF FOR AUTOMOBILES

Joseph A. Courville, Marlboro, Mass., assignor of one-half to Alice A. Courville, Marlboro, Mass.; Alice A. Courville administratrix of Joseph A. Courville, deceased Application July 20, 1939, Serial No. 285,569

8 Claims. (Cl. 74—11)

This invention relates to means for taking off power from an automobile engine or from some part actuated thereby. While capable of general application, my invention is particularly adapted to selectively operate a plurality of jacks permanently installed at the front and rear ends of an automobile or truck and may be conveniently installed in any make of car.

It is the general object of my invention to provide an improved and simplified power take-off unit which may be economically manufactured and which will be exceptionally reliable in use.

A further object is to provide a power take-off unit which is manually selective to raise or lower either the front or the rear end or both ends of an automobile or truck.

An important feature of the invention also relates to the provision of improved and simplified means for interrupting a raising or lowering operation after a predetermined period of operation, said interrupting means being closely associated with the power take-off unit and being positive in operation.

My invention further relates to arrangements and combinations of parts which will be hereinafter described and more particularly pointed out in the appended claims.

A preferred form of the invention is shown in the drawings, in which

Fig. 1 is a side elevation of my improved power take-off unit;

Fig. 2 is a plan view thereof, looking in the direction of the arrow 2 in Fig. 1;

Fig. 3 is a plan view of the take-off with the top plate removed;

Figs. 4 and 5 are sectional end elevations, taken along the lines 4—4 and 5—5 in Fig. 3;

Fig. 6 is a detached view of certain parts shown in Fig. 4;

Fig. 7 is a sectional elevation, taken along the line 7—7 in Fig. 6; and

Fig. 8 is a detail sectional view, taken along the line 8—8 in Fig. 4.

Referring to the drawings, my improved power take-off unit comprises a casing 10 having a removable cover plate 11 and removable end plates 12 and 13. The casing is commonly associated with the transmission gearing of an automobile or truck and may be supported in such position in any convenient manner. It is essential, however, that the casing should be rigidly mounted adjacent a power gear, as 14, which is connected for continuous rotation by the automobile engine or by some connected part, such as the transmission shaft.

A gear 15 is keyed to a shaft 17 which is supported in bearings within the casing 10 and which is preferably provided with bevel gears 20 and 21 fixed to the ends thereof. The gear 15 has a grooved hub 24 (Fig. 3) associated therewith and the gear 15 is slidable on the shaft 17 by operation of a shift lever 25 (Fig. 5), cross rod 26, arms 27, and studs or rolls 28 positioned in the groove of the hub 24. When the gear 15 is in the position shown in Fig. 1, the power take-off is at rest and so remains until operation of the jacks is desired.

Front and rear cross shafts 30 and 31 are rotatably mounted in bearings in the casing 10 and each cross shaft rotatably supports a pair of bevel gears 32, 33, 34 and 35. The gears 32 and 33 are loose on the front cross shaft 30 and are engaged by the bevel gear 20, and the gears 34 and 35 are similarly mounted on the rear cross shaft 31 and are engaged by the bevel gear 21. The middle portion of each shaft 30 and 31 is preferably enlarged to provide shoulders to hold the bevel gears mounted thereon in desired spaced relation.

On its inner face, each of the bevel gears 32, 33, 34 and 35 is provided with clutch elements 36 adapted to cooperate with double-face clutch collars 40 and 41, keyed to and slidable on the cross shafts 30 and 31 respectively. Each clutch collar is grooved to receive a shift plate 44 (Fig. 7) or 45 (Fig. 3) and these shift plates are mounted on front and rear cross bars 46 and 47 respectively.

The cross shafts 30 and 31 are connected in any convenient manner (as by the bevel gearing G and shafts S shown in Fig. 2) to actuate jacks permanently located at one or more points at both the front and the back of the automobile or truck on which the power take-off is installed. Any suitable jack may be used with my improved power take-off, provided only that it comprises a rotatable actuating element in some part of its construction.

For conveniently controlling my improved power take-off, I may provide a panel 60 (Fig. 1) adapted to be installed on an automobile dashboard or associated therewith, and a plurality of actuating arms 61, 62 and 63, manually operable by handles 64, 65 and 66.

The arm 61 may be connected in some convenient manner, as by a Bowden wire 70, to the arm 25 on the cross rod 26 which controls the sliding gear 15. By shifting the handle 65 from the "off" to the "on" position, the gear 15 will be engaged or disengaged with the continuously rotated power gear 14.

Bell cranks 80 and 81 are mounted on the ends of the casing 10 and have pin and slot connections with the cross bars 46 and 47 which actuate the shift plates 44 and 45. A Bowden wire 83 may connect the arm 62 to the bell crank 80 and a similar wire 84 may connect the arm 63 to the bell crank 81.

Movement of the handle 64 from neutral or mid position to the right-hand or "up" position will shift the clutch collar 40 to operate the front jacks to raise the front end of the automobile. Similar movement of the handle 66 will cause the rear end of the automobile to be raised. In each case, when the handle is returned to neutral position, it will leave one end or the other of the automobile raised. Further movement to "down" position will return said end of the automobile to its original or lowered position.

It is assumed that the connections from the shafts S to the jacks include some non-reversible transmitting devices such as worms and worm gears, so that the weight of the car cannot actuate the mechanism in reverse to lower the car when the driving connection to the gear 14 is broken.

In order that the power take-off may not overoperate the jacks, I provide an automatic knockoff for each clutch collar 40 and 41, and as these are identical, I will describe the knock-off device for the collar 40 and shift plate 44 shown in Fig. 4.

The cross bar 46 is provided with a depending and rearwardly projecting arm 90 (Fig. 7), the rear portion of which is extended transversely in both directions to provide forked ends 91 and 92 (Fig. 6) loosely embracing a cross screw 93 rotatable in bearings in the casing 10 but held from axial movement therein.

A nut 94 is threaded on the screw 93 and one flat side of the nut engages the offset portion of the arm 90, so that the nut is held from rotation but moves freely endwise on rotation of the screw 93.

A Geneva gear 95 (Fig. 1) is fixed on the end of the screw 93 and is engaged by a Geneva pinion 96 mounted on the cross shaft 30 and conveniently formed on the hub of one of the bevel gears 98 forming part of the gearing G connecting the cross shafts 30 and 31 to the transmitting shafts S.

Each revolution of the shaft 30 will advance the Geneva gear 95 one space and will correspondingly move the nut 94 towards the forked end 91 or 92 of the arm 90 fixed to the cross bar 46. After a predetermined period of operation, the nut 94 will engage the forked end 91 or 92 and will force the clutch collar 40 out of engagement with the pinion 32 or 33 with which it has been previously and manually engaged. Further operation of the jacks is thus prevented.

It will be noted that the lost motion connection between the nut 94 and the forked ends 91 and 92 of the arm 90 allows a predetermined period of jack operation, which may be made of any desired length, and this lost motion connection also allows manual interruption of operation by means of the handle 64 at any desired point.

The parts for controlling the operation of the rear cross shaft 31 and rear jacks are identical with the control elements above described.

Having described the details and operation of my improved power take-off unit, it will be seen that I have provided a simple and direct selective control for the jacks at the front and rear ends of an automobile respectively, and that I have provided an automatic knock-off which is directly associated with the power take-off unit and which is entirely positive in its disengaging operation. This not only substantially reduces the number of parts and the expense over previous constructions in which an automatic knock-off is actuated from each separate jack, but also makes the operation much more positive and reliable and eliminates the possibility of loose connections which might otherwise permit the jack to overrun, with more or less disastrous effects.

Having thus described my invention and the advantages thereof, I do not wish to be limited to the details herein disclosed, otherwise than as set forth in the claims, but what I claim is:

1. In an automobile having a plurality of permanently installed jacks and a continuously rotated power gear, a power take-off unit comprising a casing, a drive shaft journalled in said casing, a gear slidable on said drive shaft into and out of engagement with said rotating power gear, a manual control device for said sliding gear, front and rear bevel gears mounted on and rotatable with said drive shaft, front and rear cross shafts journalled in said casing, a pair of oppositely disposed bevel gears loosely rotatable in spaced relation on each front and rear cross shaft, said latter gears continuously engaging said bevel gears on said drive shaft and being rotated in opposite directions thereby, separate manually operable clutch means on each front and rear cross shaft by which said cross shafts may be selectively connected for rotation by either bevel gear thereon, and driving connections from said front and rear shafts to the front and rear jacks associated therewith.

2. The combination in a power take-off unit as set forth in claim 1, in which each cross shaft when rotated positively and progressively rotates a cross screw and in which a nut on said cross screw engages and releases the clutch means associated with the cross shaft which drives said cross screw after predetermined rotation of said cross shaft and said cross screw.

3. The combination in a power take-off unit as set forth in claim 1, in which each cross shaft when rotated positively and progressively rotates a cross screw and in which a nut on said cross screw engages and releases the clutch means associated with the cross shaft which drives said cross screw after predetermined rotation of said cross shaft and said cross screw, said nut and clutch means having a lost motion connection permitting manual release of said cross shaft at all times.

4. The combination in a power take-off unit as set forth in claim 1, in which each cross shaft when rotated positively and progressively rotates a cross screw and in which a nut on said cross screw engages and releases the clutch means associated with the cross shaft which drives said cross screw after predetermined rotation of said cross shaft and said cross screw, said cross shaft and cross screw having a Geneva gear connection.

5. The combination in a power take-off unit as set forth in claim 1, in which automatic disengaging means is mounted directly on said power take-off unit and is operative to disengage the clutch means associated with a selected cross shaft after predetermined rotation of said selected cross shaft.

6. In an automobile having a plurality of permanently installed jacks and a continuously rotated power gear, a power take-off unit comprising a casing, a drive shaft journalled in said casing, a gear slidable on said drive shaft into and out of engagement with said rotating power gear, a manual control device for said sliding gear, front and rear bevel gears mounted on and rotatable with said drive shaft, front and rear cross shafts journalled in said casing, a pair of oppositely disposed bevel gears loosely rotatable in spaced relation on each front and rear cross shaft, said latter gears continuously engaging said bevel gears on said drive shaft and being rotated in opposite directions thereby, clutch means on the inner faces of said oppositely rotated bevel gears, a clutch collar keyed to each cross shaft and slidable thereon to engage the clutch means on either associated rotating bevel gear, a separate manual control device to engage or disengage each clutch collar, and additional automatic means to disengage each clutch collar after a predetermined period of operation thereof.

7. In an automobile having a plurality of permanently installed jacks and a continuously rotated power gear, a power take-off unit comprising a casing, a drive shaft journalled in said casing, a gear slidable on said drive shaft into and out of engagement with said rotating power gear, a manual control device for said sliding gear, front and rear bevel gears mounted on and rotatable with said drive shaft, front and rear cross shafts journalled in said casing, a pair of oppositely disposed bevel gears loosely rotatable in spaced relation on each front and rear cross shaft, said latter gears continuously engaging said bevel gears on said drive shaft and being rotated in opposite directions thereby, clutch means on the inner faces of said oppositely rotated bevel gears, a clutch collar keyed to each cross shaft and slidable thereon to engage the clutch means on either associated rotating bevel gear, a separate manual control device to engage or disengage each clutch collar, and additional automatic means to disengage each clutch collar after a predetermined period of operation thereof, said automatic means being mounted on said power take-off unit and directly operating a clutch-releasing device within the power take-off casing.

8. In an automobile having a plurality of permanently installed jacks and a continuously rotated power gear, a power take-off unit comprising a casing, a drive shaft journalled in said casing, a gear slidable on said drive shaft into and out of engagement with said rotating power gear, a manual control device for said sliding gear, front and rear bevel gears mounted on and rotatable with said drive shaft, front and rear cross shafts journalled in said casing, a pair of oppositely disposed bevel gears loosely rotatable in spaced relation on each front and rear cross shaft, said latter gears continuously engaging said bevel gears on said drive shaft and being rotated in opposite directions thereby, clutch means on the inner faces of said oppositely rotated bevel gears, a clutch collar keyed to each cross shaft and slidable thereon to engage the clutch means on either associated rotating transfer gear, a separate manual control device to engage or disengage each clutch collar, and additional automatic means to disengage each clutch collar, each automatic means comprising a cross screw mounted in said casing and having a nut which has lost motion engagement with said clutch collar control device, and an intermittently operating gear connection between said cross shaft and said cross screw.

JOSEPH A. COURVILLE.